(12) United States Patent
Kuiawa et al.

(10) Patent No.: US 7,519,909 B2
(45) Date of Patent: Apr. 14, 2009

(54) UNINTERRUPTIBLE POWER SUPPLY (UPS) DEVICES MONITORING SYSTEM

(75) Inventors: Christian L. Kuiawa, Warwick, RI (US); David A. Cardimino, Jr., Warwick, RI (US); Todd J. Giaquinto, Cranston, RI (US); Jeffrey J. Brown, Coventry, RI (US); David J. Smith, East Grenwich, RI (US); Elizabeth Schultz, North Kingston, RI (US)

(73) Assignee: American Power Conversion Corporation, West Kingston, RI (US)

( * ) Notice: Subject to any disclaimer, the term of this patent is extended or adjusted under 35 U.S.C. 154(b) by 517 days.

(21) Appl. No.: 09/927,822

(22) Filed: Aug. 10, 2001

(65) Prior Publication Data

US 2003/0033550 A1 Feb. 13, 2003

(51) Int. Cl.
*G06F 3/00* (2006.01)
(52) U.S. Cl. .................. 715/736; 715/853; 715/734
(58) Field of Classification Search .......... 345/736, 345/740, 809, 835–839, 846, 637; 709/224; 713/340; 715/853, 736, 734
See application file for complete search history.

(56) References Cited

U.S. PATENT DOCUMENTS

| 5,479,599 | A | * | 12/1995 | Rockwell et al. | 715/837 |
| 5,751,965 | A | * | 5/1998 | Mayo et al. | 709/224 |
| 5,764,913 | A | * | 6/1998 | Jancke et al. | 709/224 |
| 5,802,383 | A | * | 9/1998 | Li et al. | 345/420 |
| 5,825,656 | A | * | 10/1998 | Moore et al. | 702/60 |
| 5,958,012 | A | * | 9/1999 | Battat et al. | 709/224 |
| 5,961,604 | A | * | 10/1999 | Anderson et al. | 709/229 |
| 6,229,538 | B1 | * | 5/2001 | McIntyre et al. | 715/734 |
| 6,269,398 | B1 | * | 7/2001 | Leong et al. | 709/224 |
| 6,271,845 | B1 | * | 8/2001 | Richardson | 715/764 |
| 6,351,776 | B1 | * | 2/2002 | O'Brien et al. | 709/245 |
| 6,456,306 | B1 | * | 9/2002 | Chin et al. | 715/810 |
| 6,590,587 | B1 | * | 7/2003 | Wichelman et al. | 715/736 |
| 6,618,163 | B1 | * | 9/2003 | Roosen et al. | 358/1.15 |
| 6,865,685 | B2 | * | 3/2005 | Hammond et al. | 713/340 |
| 6,970,167 | B1 | * | 11/2005 | Kumamoto et al. | 345/440 |
| 2002/0184361 | A1 | * | 12/2002 | Eden | 709/224 |
| 2003/0011647 | A1 | * | 1/2003 | Abbondanzio et al. | 345/853 |
| 2003/0085624 | A1 | * | 5/2003 | Kadoi et al. | 307/64 |

FOREIGN PATENT DOCUMENTS

WO WO 98/55934 12/1998

* cited by examiner

*Primary Examiner*—Stephen S Hong
*Assistant Examiner*—Ryan F Pitaro
(74) *Attorney, Agent, or Firm*—Townsend and Townsend and Crew LLP

(57) ABSTRACT

Aspects of the invention are directed to monitoring a plurality of UPS devices coupled to a network. According to one aspect of the invention, a computer is coupled to the plurality of UPS devices through the network and monitors the states of the UPS devices by using a UPS devices monitoring icon. The UPS monitoring icon takes on various shapes depending on the status or state of one or more UPS devices being monitored and generally acts as an annunciator to the status or state. For example, the UPS monitoring icon 500 can take on one of four symbols depending on whether the UPS devices are operating normally or one or more UPS devices have been diagnosed as being in a "critical" state, a "warning" state or an "unknown" state.

20 Claims, 11 Drawing Sheets

UNINTERRUPTIBLE POWER SUPPLY (UPS) DEVICES MONITORING SYSTEM

BACKGROUND OF THE INVENTION

1. Field of the Invention

The present invention relates to a method and an apparatus for monitoring a plurality of uninterruptible power supply (UPS) devices, and in particular to a method and an apparatus for monitoring a plurality of UPs devices in a network system.

2. Background of the Invention

Uninterruptible power supply (UPS) devices are widely used to protect telecommunication systems, data and computing systems and other electrical systems from power failure where loss of data or signals can have a detrimental impact to the operation of the system. Generally, a UPS device contains a charging circuit that is powered by an AC power source and a rechargeable battery that is continuously charged by the charging circuit during operation. The system that is protected by the UPS device is either powered by the battery or the AC power source via the UPS device. If power failure does occur and the AC power source is interrupted during operation, the battery continues to power the system until the AC power source is able to resume supplying power, which then replenishes the battery's energy. In other instances, such as in a computer system, for example, the battery of the UPS device stores a charge that is just sufficient to operate the system until the system is able to back up its data in a volatile memory (such as random access memory) to a more stable non-volatile memory (such as a disk drive), thereby ensuring that no data is lost.

There are many instances in which an operation is performed by multiple systems requiring several UPS devices. For example, an Internet service provider may use multiple servers to provide its Internet service, wherein each server is protected by a UPS device. These servers provide for the interchange of information for numerous clients that have access to the servers. Typically, the servers are in a single location or they are dispersed in various locations. In either case, because there are numerous UPS devices involved, it is difficult to keep track of the status and state of those various UPS devices. In one known method, a service personnel is employed to make regular rounds to check on the UPS devices and correct any abnormalities. However, this method is time consuming, inefficient and further is unable to detect UPS device problems between service rounds.

SUMMARY OF THE INVENTION

According to one aspect of the invention, in a computer system coupled to a plurality of UPS devices through a network, a method of monitoring a state of the UPS devices comprises generating a UPS devices monitoring icon on a computer display, wherein the UPS devices monitoring icon has a first symbol that indicates all the UPS devices being managed by the computer system are in a normal state and causing the UPS devices monitoring icon to change to a second symbol when at least one UPS device being managed changes to an abnormal state. Other aspects of the invention will be further described in the detailed description to follow.

BRIEF DESCRIPTION OF THE DRAWINGS

For better understanding of the invention, reference is made to the drawings which are incorporated herein by reference and in which.

DETAILED DESCRIPTION OF THE INVENTION

Figure 1:
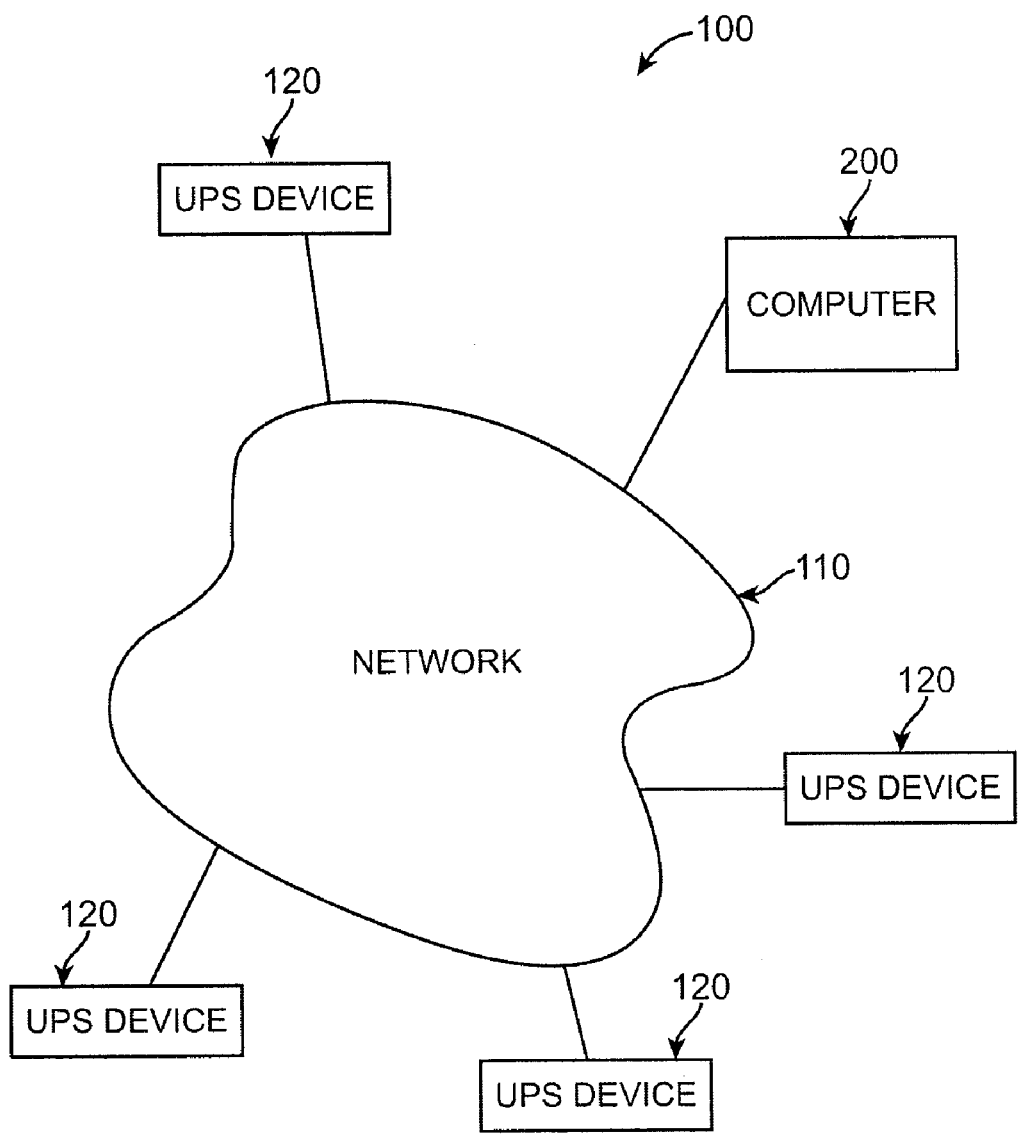
FIG. 1 is a schematic diagram of a UPS devices monitoring system comprising a network in which a computer and a plurality of UPS devices are coupled to the network in accordance with an embodiment of the invention.

One embodiment of the invention will now be described with reference to FIG. 1 which illustrates an uninterruptible power supply (UPS) monitoring system 100 comprising a network 110, a computer 200 and a plurality of UPS devices 120, wherein each UPS device 120 protects an electrical system. The network 110 can be a local area network (LAN), a wide area network (WAN) or the Internet.

The network 110 provides a communication link which is bi-directional between the computer 200 and the plurality of UPS devices 120. In the context of a LAN network, communication between the computer 200 and the plurality of UPS devices 120 can be achieved using Ethernet, Token Ring or one of a number of available LAN network protocols. In the context of WAN network or the Internet, communication between the computer 200 and the plurality of UPS devices 120 can be achieved using Transmission Control Protocol (TCP)/Internet Protocol (IP) or one of a number of available IP protocols. The electrical system can be a telecommunication system, a data processing system, a computing system or one of a number of other systems.

In one embodiment, the UPS device 120 communicates with the computer 200 through a network interface card that is contained within the UPS device 120. In this instance, the UPS device 120 is directly coupled to the network 110. In another embodiment, the UPS device is coupled to an agent via a serial bus such as RS-232 or Universal Serial Bus (USB) and is indirectly coupled to the network 110 via an agent. The agent communicates with the computer 200 through the network 110 and transmits the communication contents to the UPS device 120 through the serial bus.

Figure 2:
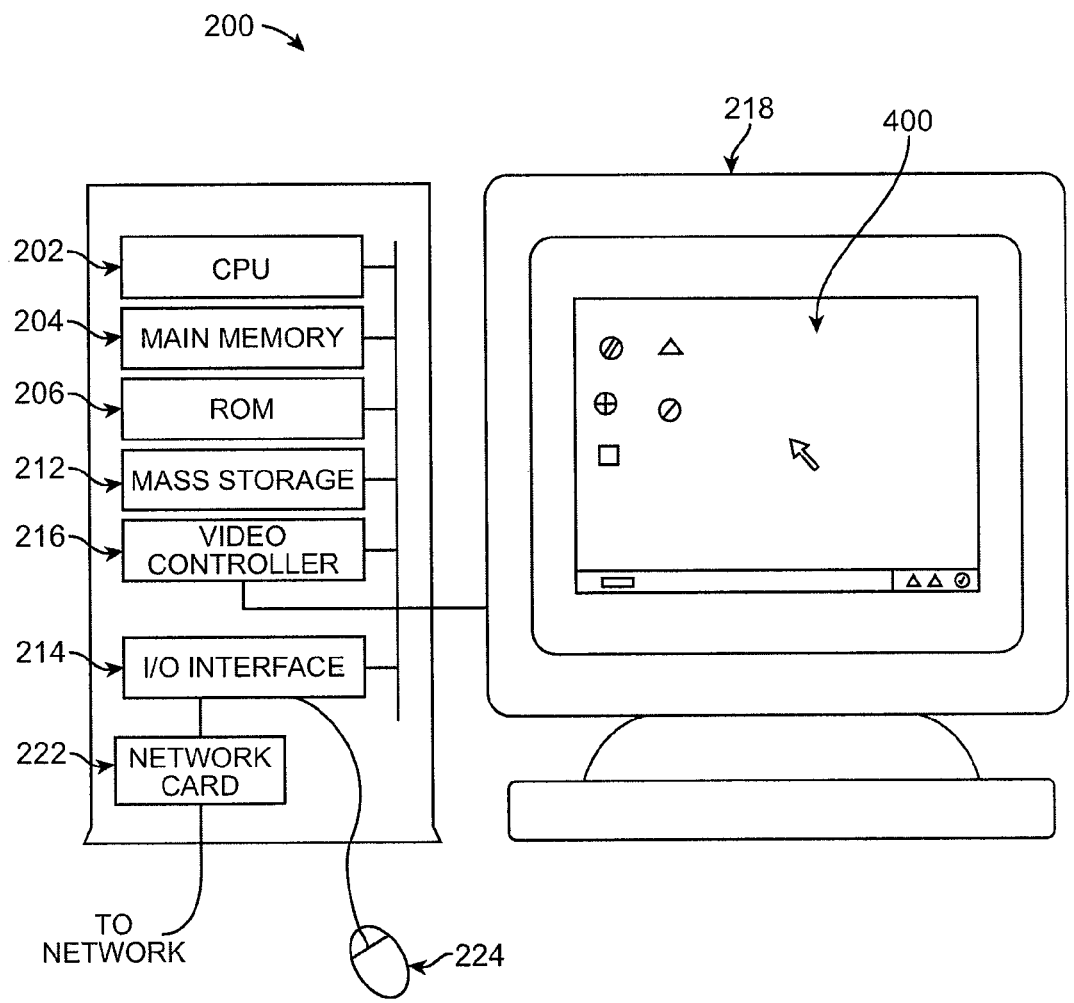
FIG. 2 is a schematic diagram of the computer of FIG. 1, which monitors the UPS devices in accordance with an embodiment of the invention.
Figure 3:
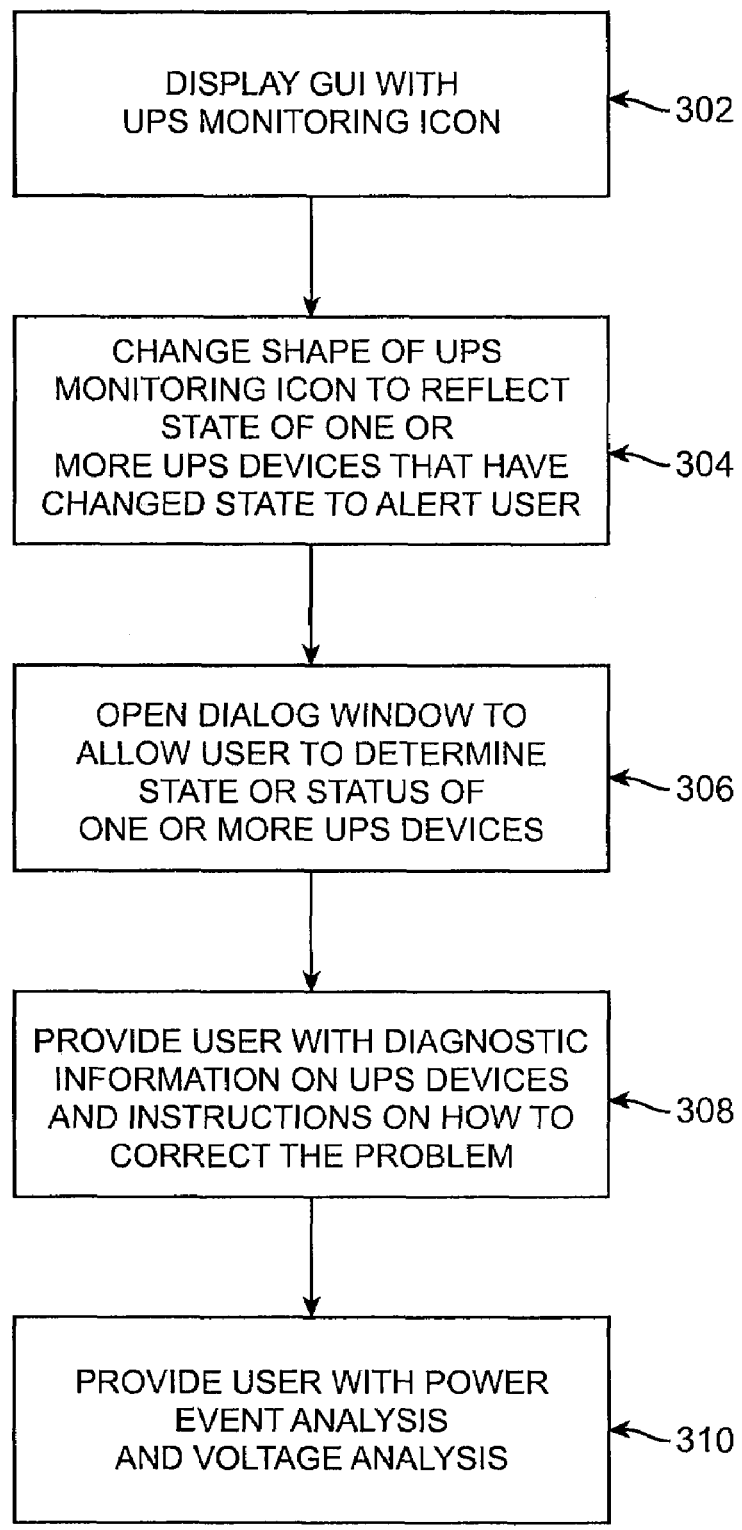
FIG. 3 is a flow diagram of the UPS device monitoring system in accordance with an embodiment of the invention.
Figure 4:
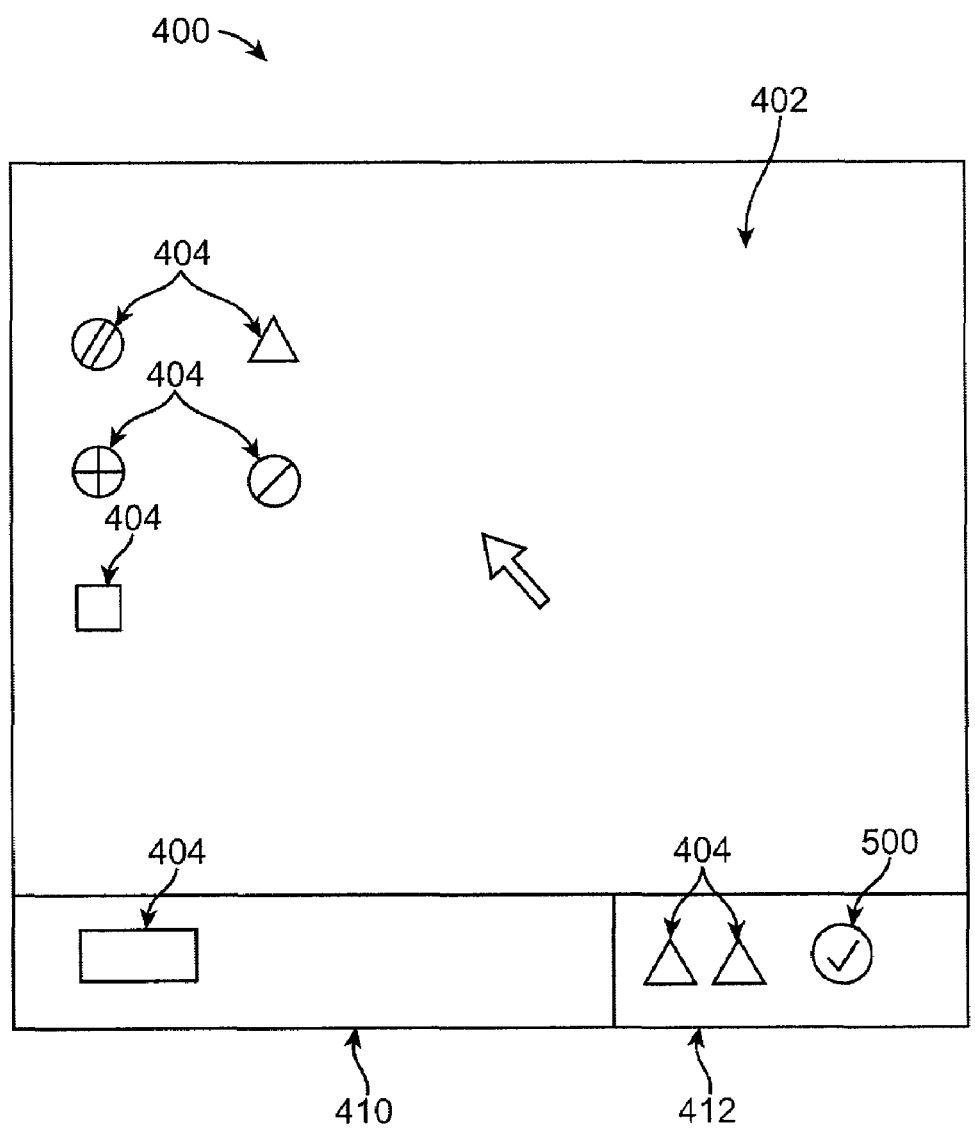
FIG. 4 is a graphic user interface (GUI) that has implemented a UPS devices monitoring icon in accordance with an embodiment of the invention.

The computer 200 will now be described in further detail with reference to FIG. 2. In one embodiment, a general purpose computer can be used such as those available from IBM based in Armonk, N.Y., Apple Computer Inc. based in Cupertino, Calif., Sun Microsystems Inc. based in Palo Alto, Calif. and a number of other companies. Usually, the general purpose computer 200 includes a central processing unit (CPU) 202, a main memory 204 (usually in the form of random access memory or RAM), a read only memory or ROM 206 that typically includes a Basic Input Output System or BIOS), a mass storage device 212 such as a magnetic or optical disk drive or a non-volatile memory device such as a Flash memory, an input/output (I/O) interface 214 and a video controller 216, all coupled together through a system bus 208. A network interface card 222 is coupled to the I/O interface 214 to allow for the computer 200 to communicate with the network 110. Further, a pointing device such as a mouse 224 is also coupled to the I/O interface 214 to allow a user to interact with the computer 200. A display device such as a computer monitor 218 can be coupled to the video controller 216, wherein the computer monitor 218 can display various graphic user interfaces (GUIs) 400 in accordance with the invention.

A GUI typically allows a user to interact with the computer without resorting to memorizing numerous data files or application program names and computer commands. Usually, the GUI provides one or more graphical symbols known as "icons" where each icon represents a file, an application program or a computer command among others. The user selects an icon by clicking on the icon using the mouse 224. The user's action causes the computer 200 to perform an operation represented by the icon. A Windows operating system commercially available from Microsoft Inc., based in Redmond, Wash. is a typical example of a GUI driven system.

Operations of a GUI driven computer 200 to monitor UPS devices 120 in accordance with the embodiments of the invention will now be described with reference to FIGS. 3-8. In stage 302, with reference to FIG. 4, a GUI 400 in a form of a window is displayed on the computer monitor 218 of the computer 200 (see FIG. 2). In one embodiment, the GUI 400 can be the main window of the Windows operating system available from Microsoft Inc. The GUI 400 comprises a main screen 402 containing a plurality of icons 404, each icon 404 representing an application program, an application data or a computer command, among others. The GUI 400 further comprises a horizontal menu bar 410 that is generally located at the bottom of the main screen 402. The menu bar 410 includes a system tray 412, which among other icons, contains a UPS monitoring icon 500. It should be noted that the UPS monitoring icon 500 can be placed on the main screen 402 or any part of the GUI 400 based on design choice.

Figure 5:
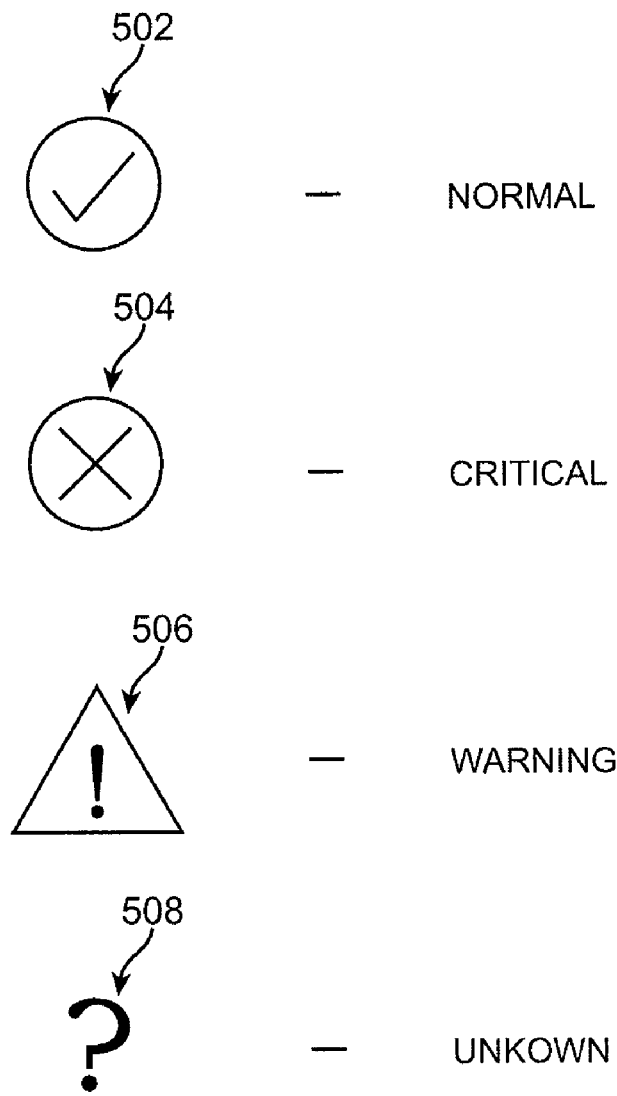
FIG. 5 illustrates various symbols the UPS devices monitoring icon can take depending on a state of one or more UPS devices in accordance with one embodiment of the invention.

In one embodiment, the UPS monitoring icon 500 takes on various shapes depending on the status or state of one or more UPS devices 120 being managed and generally acts as an annunciator to the status or state (stage 304). For example, the UPS monitoring icon 500 can take on one of four symbols depending on whether the UPS 120 devices are operating normally or one or more UPS devices 120 have been diagnosed as being in a "critical" state, a "warning" state or an "unknown" state. As shown in FIG. 5, if all UPS devices 120 are diagnosed as being normal, the UPS monitoring icon 500 takes on a symbol 502 of a green circle with a white check mark inside. Otherwise, if one or more UPS devices 120 are in critical state, the UPS monitoring icon 500 takes on a symbol 504 of a red circle with a white cross mark inside. However, if one or more UPS devices 120 are in warning state, the UPS monitoring icon 500 takes on a symbol 506 of a yellow triangle with a black exclamation mark inside. One or more UPS devices 120 in unknown state causes the UPS monitoring icon 500 to take on a symbol 508 of a black question mark. In one embodiment, a symbol other than a normal symbol will start flashing to draw the attention of the user. Other variations of annunciating status or state of the UPS devices 120 can be used. For example, instead of using different symbols, the color of the UPS monitoring icon 500 can change depending on the status or state of the UPS devices 120.

In situations where different UPS devices 120 are in different states, according to one embodiment, the UPS monitoring icon 500 will take on the symbol 502-508 that is dictated by an order of priority. For example, if a UPS device 120 has been diagnosed as being in the critical state, and if another UPS device 120 has been diagnosed as being in the warning state, the UPS monitoring icon 500 will take on the critical symbol 504 if the order of priority is critical state, warning state and unknown state in the descending order. In another embodiment, the UPS monitoring icon 500 will alternate between the critical symbol 504 and the warning symbol 506 to indicate the different states of the UPS devices 120.

Figure 6:
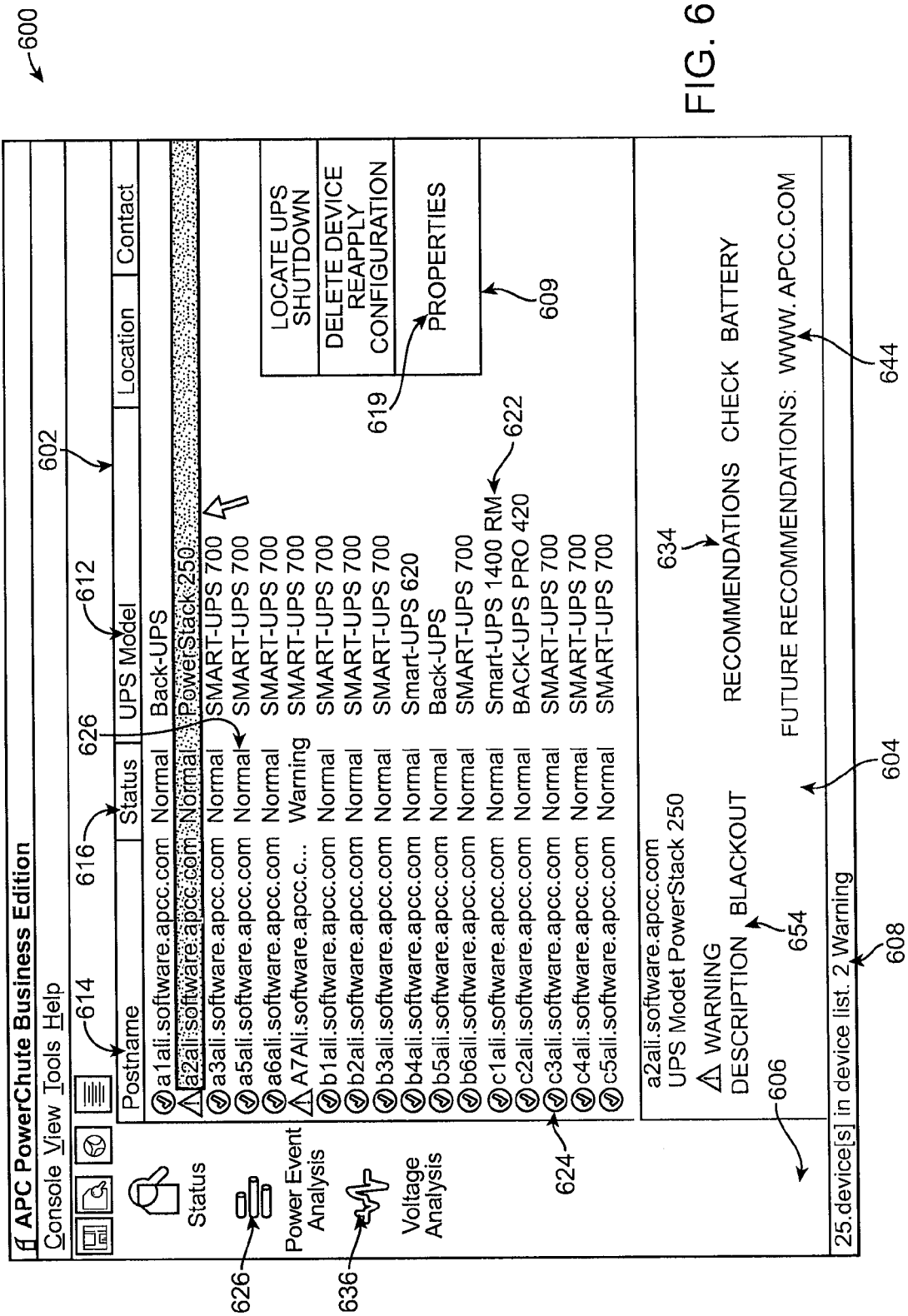
FIG. 6 is a dialog window that opens in the computer display of the computer when the UPS devices monitoring icon is clicked in accordance with one embodiment of the invention.

In stage 306, when the user becomes aware of the change in the symbol 502-508 of the UPS monitoring icon 500, which represents an abnormal status, the user can click the UPS monitoring icon 500 using the mouse 224 to determine the status or state of the UPS devices 120. With reference to FIG. 6, the user's action causes the computer 200 to open a dialog window 600 in the computer monitor 218. The dialog window 600 comprises a main window 602, a status window 604, a vertical menu bar 606 and a horizontal status bar 608. The status window 604 is generally located at the bottom of the main window 602 and the vertical menu bar 606 is generally located at the left side of the main window 602. The horizontal status bar 608 is generally located at the bottom of the status window 604. The main window 602 comprises a UPS device list 612, a symbol column 614 and a status column 616. The UPS device list contains 612 a list of UPS devices 622 currently being managed. The symbol column 614 is provided on the left side of the UPS device list 612 and contains a symbol 624 for each listed UPS device 622 representing the status or state of the UPS device 120 connected to the network 110. In one embodiment, the symbols 624 in the symbol column 614 are similar in shape to the symbols 502-508 (see FIG. 5) of the power monitoring icon 500, thus as shown in the figure, the UPS devices 120 that are operating normally will have a symbol that is a green circle with a white check mark inside. Similarly, the UPS device 120 that has been diagnosed as being in warning state has a symbol with a yellow triangle with a black exclamation mark inside. For those users that require additional explanation of the symbols 624, on the same row, the status column 616 indicates in writing the status or state of the listed UPS devices 622. Thus, for those listed UPS devices 622 operating normally, the status column 616 will indicate the state with the word "Normal." On the other hand, if a UPS device 622 has been diagnosed as being in the warning state, the status column 616 will indicate the state with the word "Warning."

In stage 308, the user can obtain further diagnostic information about a listed UPS device 622 by highlighting the UPS device 622 in the main window 602. Using the mouse 224, the user can point to the listed UPS device 622 and click a button (usually the left button) on the mouse 224 causing the pointed UPS device 622 to be highlighted. When the listed UPS device 622 is highlighted, the status window 604 displays a chronology of events 654 that caused the listed UPS device 622 to be diagnosed in a certain state. For example, if a listed UPS device 622 has been subjected to a power failure, the UPS device 622 would be placed in a warning state due to the power failure. And the status window 604 will list the power failure as the cause of the warning state.

In one embodiment, in addition to providing a chronology of events 654 leading to the listed UPS device 622 being diagnosed in an abnormal state, the status window 604 can provide recommended instructions 634 on how to correct the abnormal state so that the listed UPS device 622 can revert back to its normal state. For additional instructions or instructions that are detailed and/or complex, the status window 604 can provide a link 644 to a support Website where the user can obtain further instructions and help.

In stage 310, prior to sending service personnel to inspect the suspect UPS device 120, the user can obtain further analysis on the UPS device 120. With its associated listed UPS device 622 highlighted, the user can click one of the several icons on the vertical menu bar 606 that provides analysis of the UPS device 120. In the illustrated embodiment, the vertical menu bar 606 contains two icons which are Power Event Analysis 626 and Voltage Analysis 636.

Figure 7:
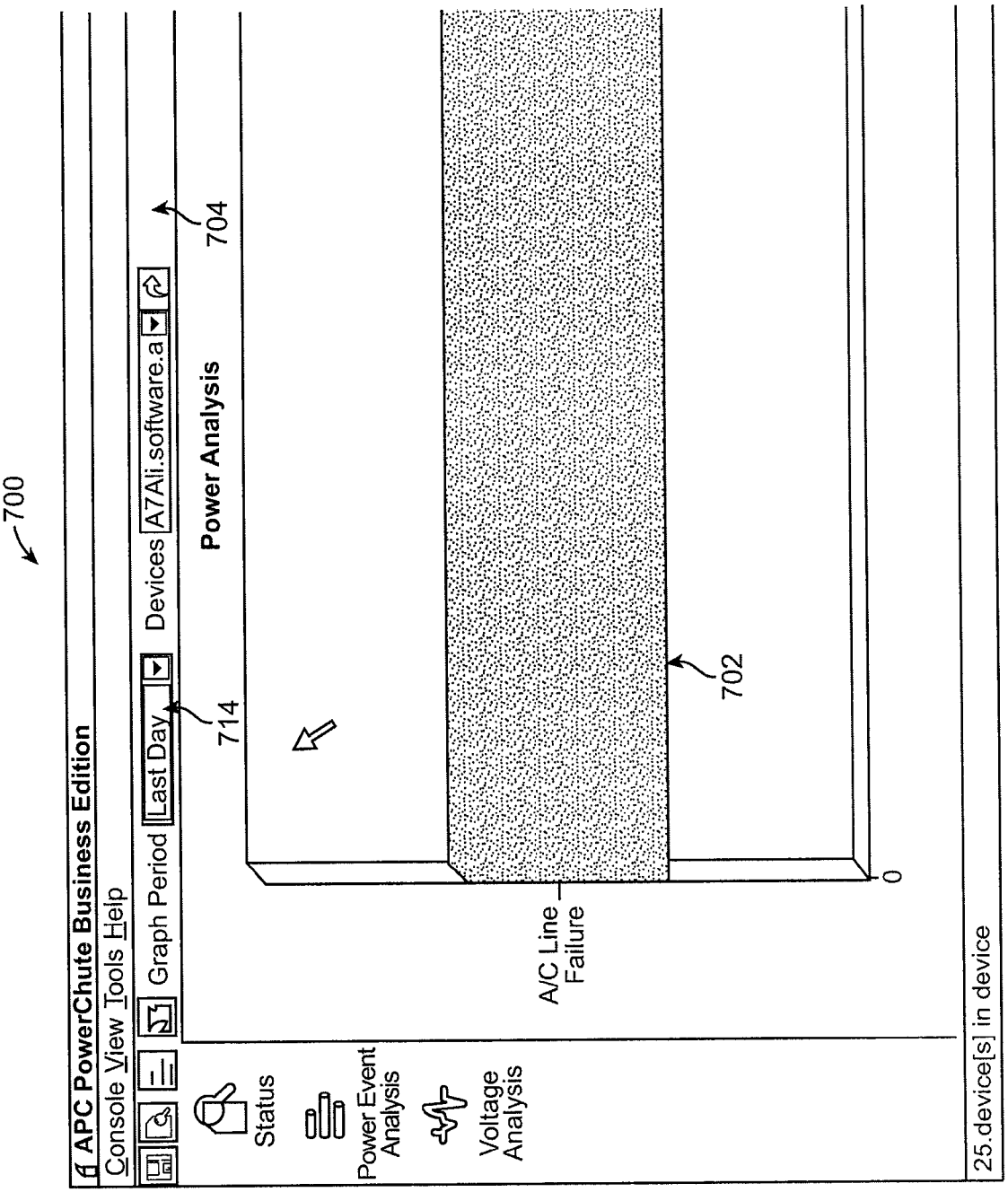
FIG. 7 is a power event analysis window that displays power analysis in accordance with one embodiment of the invention.

With reference to FIG. 7, if the user clicks the Power Event Analysis icon 626, a power event analysis window 700 opens in the computer monitor 218. The power event analysis window 700 displays in graph form the power analysis 702 of the UPS device. A time period of the power analysis can be selected using a time period selection menu 714 located at a menu bar 704 which is generally located at the top of the power event analysis window 700. From the time period selection menu 714, the user can select a time period in which to review the history of power events of the UPS device. With the time period selected, the user can analyze power fluctuations within the time period in the UPS device. The power analysis displays to the user a history of the events that have occurred at the UPS device within the time period, such as the graph showing the number of power failures that have occurred 702. The power analysis additionally can display graphs of information derived from the history of events that have occurred at the UPS device, for example, showing the number of blackouts that lasted longer than some predetermined length of time. Another example is graphing occurrences where the input power to the UPS device remained higher than the standard input voltage for some predetermined time, or fluctuated above the standard input voltage a predetermined number of times.

Figure 8:
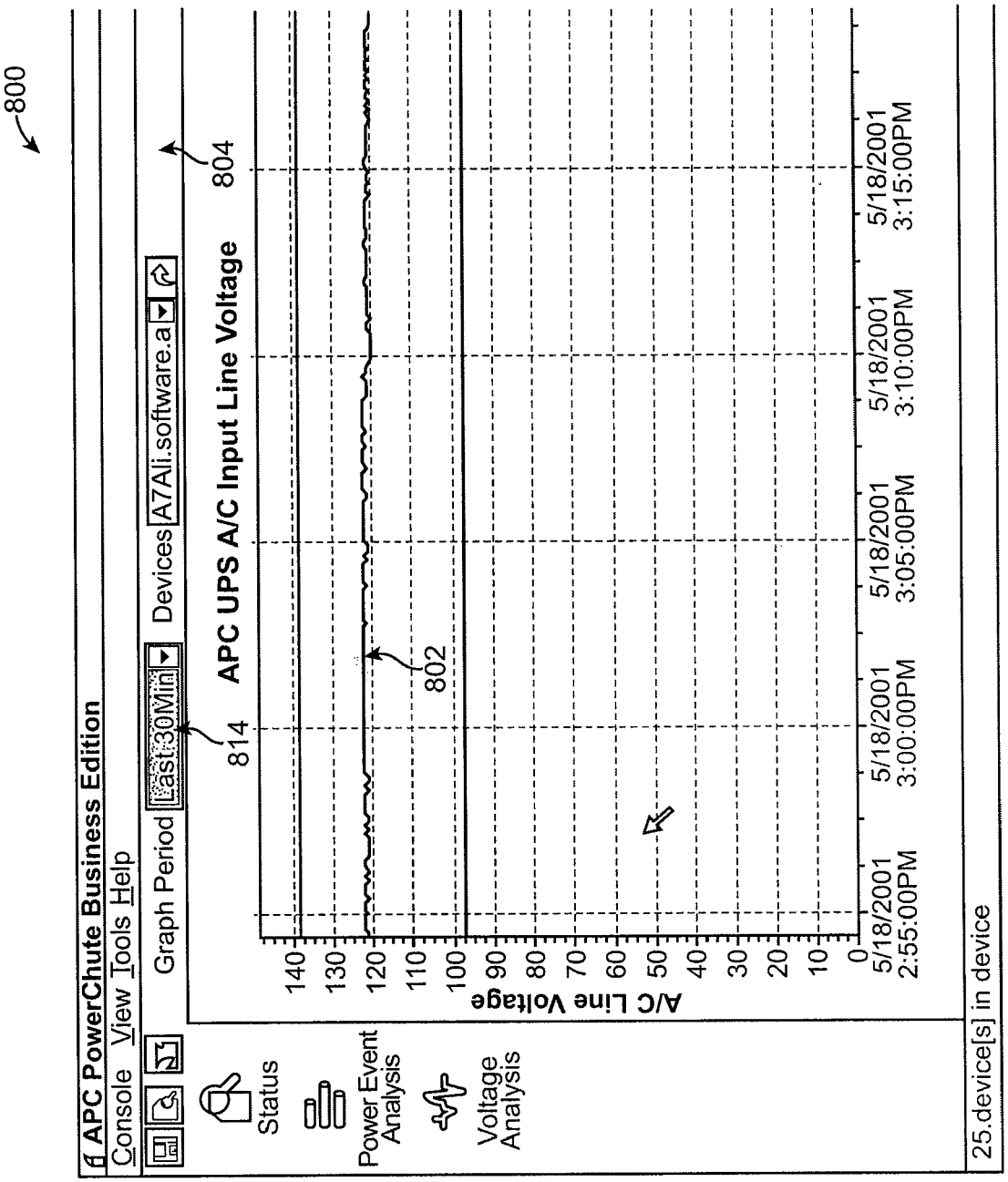
FIG. 8 is a voltage analysis window that displays voltage analysis in accordance with one embodiment of the invention.

With reference to FIG. 8, if the user clicks the Voltage Analysis icon 636, a voltage analysis window 800 opens in the computer monitor 218 to display in graph form the voltage analysis 802 of the UPS device. A time period selection menu 814 is also provided at the menu bar 804 of the voltage analysis window 800 in which a time period for the voltage analysis can be selected. Once the user has selected a time period, a voltage analysis graph 802 for the time period is generated in which the user can analyze voltage fluctuations in the UPS device.

Figure 9:
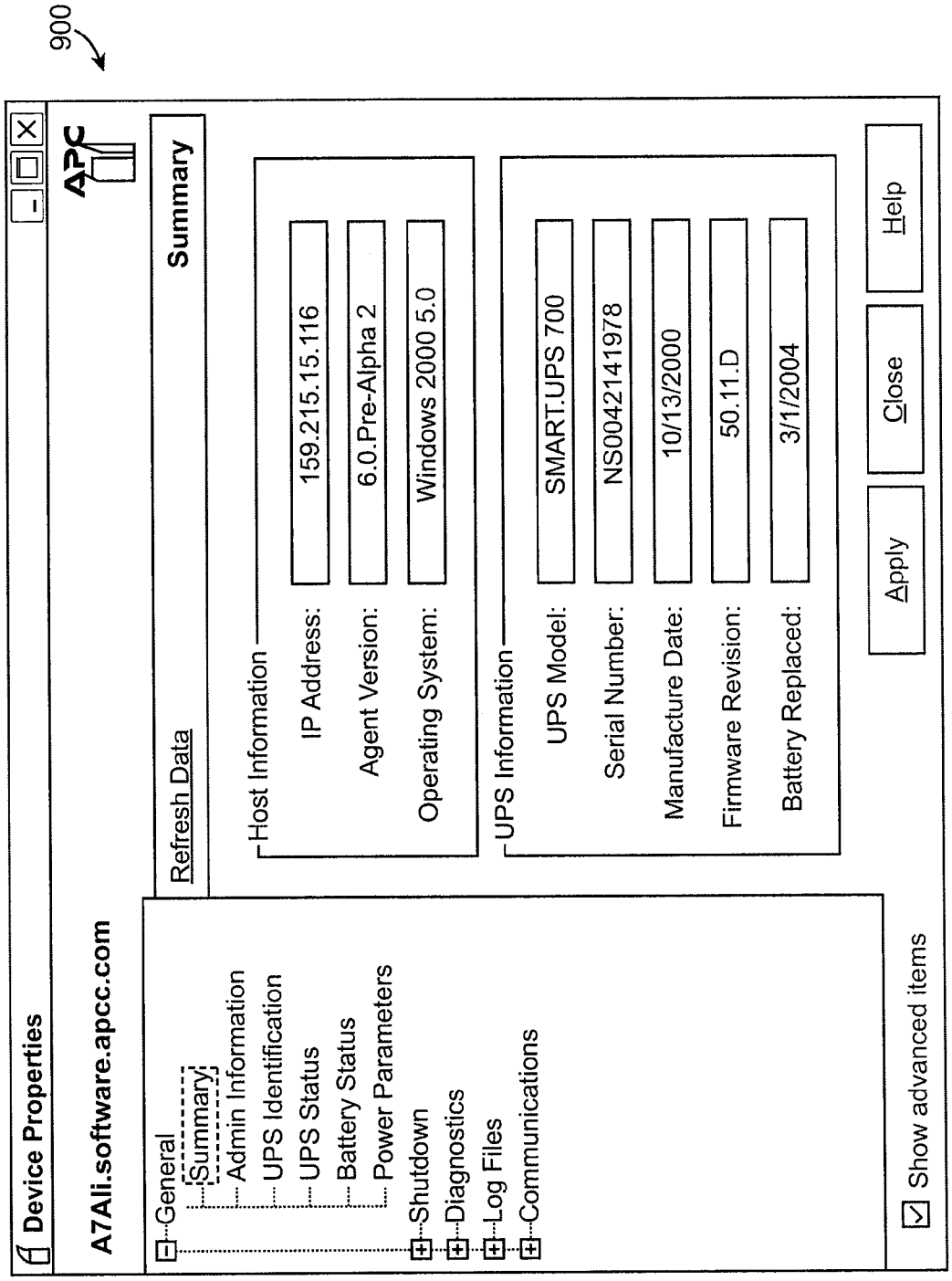
FIG. 9 is a device properties window the displays information about a UPS device being monitored in accordance with an embodiment of the invention.

Other features are available in the GUI driven computer 200 for monitoring UPS devices. Referring back to FIG. 6, at the main window 602 of the dialog window 600, the user can obtain device configuration of a listed UPS device 622. The user first highlights the UPS device 622 and clicks a button (usually the right button) of the mouse 224. The user's action causes a floating menu 609 to appear on the main window 602. The floating menu 609 contains a list of options in which the user can make a selection. When the user clicks the properties option 619 a device properties window 900 opens in the computer monitor 218. With reference to FIG. 9, the device properties window 900 displays pertinent UPS device information such as UPS model number, serial number, manufacture date, firmware revision, the date the battery was replaced and other information.

Figure 10:
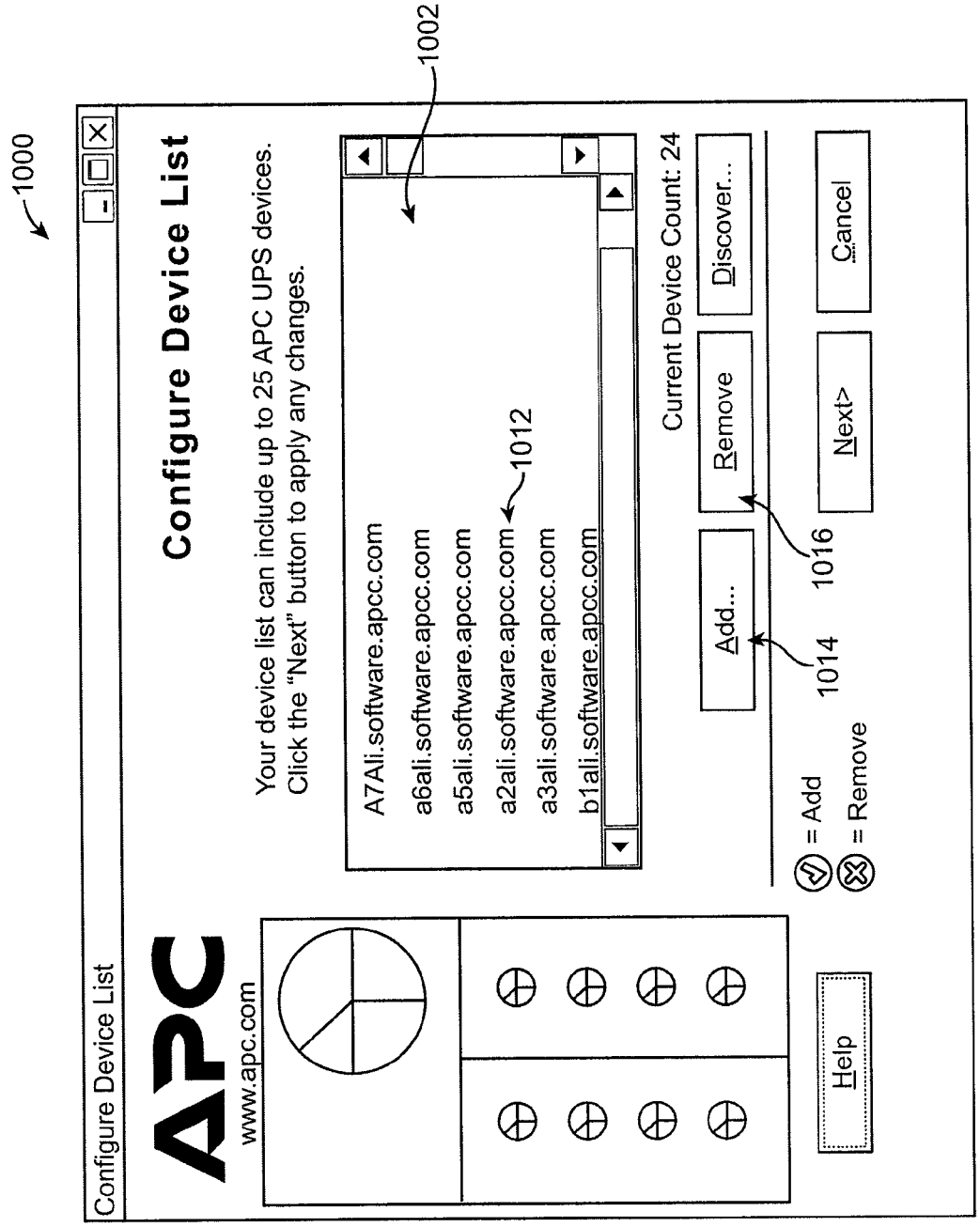
FIG. 10 is a device list window in which a UPS device being monitored can be added or deleted in accordance with an embodiment of the invention.

Another feature of embodiments of the invention allows a UPS device 120 to be added or deleted to the UPS device list 612 in the main window 602 of the dialog window 600. At the main window 602, without any of the listed UPS devices 622 being highlighted, the user clicks a button (usually the right button) of the mouse 224, which causes a device list window 1000 to open in the computer monitor 218 as shown in FIG. 10. The device list window 1000 has a main window 1002 that contains a list of UPS devices 1012 being managed. At the bottom of the main window 1002, there are two icons 1014, 1016 marked "add" and "remove" respectively. The user can add another UPS device by clicking the add icon 1014 or the user can highlight a UPS device on the UPS device list 1012 and click the remove icon 1016, which removes the highlighted UPS device.

Figure 11:
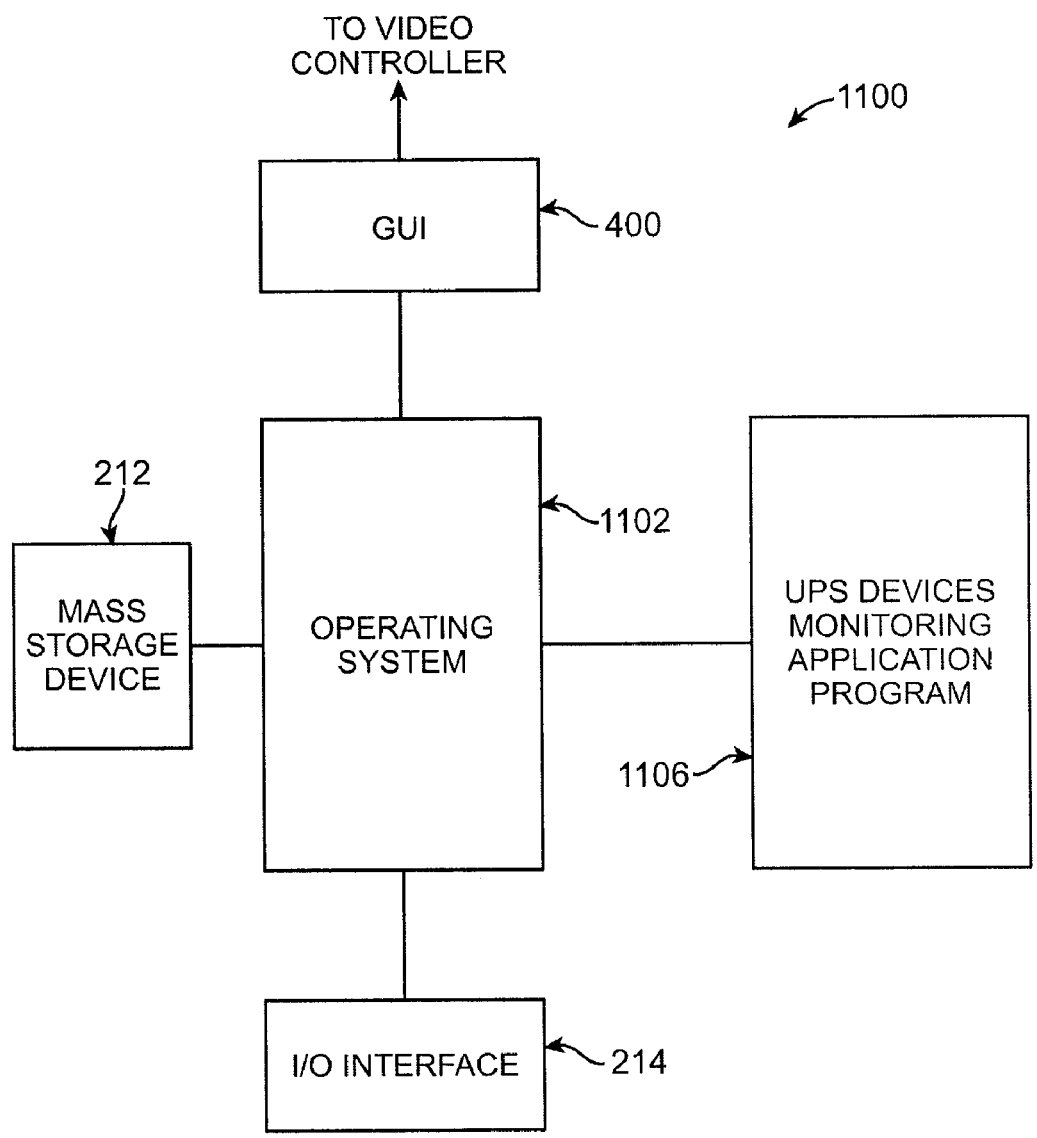
FIG. 11 is a block diagram that illustrates an interaction between the operating system of the computer and the UPS devices application program in accordance with an embodiment of the invention.

With reference to FIG. 11 in conjunction with FIG. 2, generation of the GUIs in the GUI driven computer 200 and the generation of status or state information and diagnostic information will now be described. Turning to FIG. 11, a block diagram 1100 is shown that illustrates an interaction between an operating system 1102, GUIs 400, a UPS devices monitoring application program 1106 and the I/O interface 214. In one embodiment, the operating system 1102, the GUI 400 and UPS devices monitoring application program 1106 can be stored in the main memory 204 with portions thereof stored in the mass storage device 212 (see FIG. 2). The operating system 1102 can be the Windows operating system available from Microsoft Inc. The UPS devices monitoring application program 1106 contains a sequence of computer instructions that interacts with the operating system 1102 which when executed by the CPU 202 causes the computer 200 (see FIG. 2) to perform the operations as described with respect to FIGS. 3-10. As is well known the art, the operating system 1102 interfaces with application programs such as the UPS devices monitoring application program 1106 and the computer hardware as shown in FIG. 2 so that I/O instructions of the UPS devices monitoring application program 1106 will be understood by the I/O devices of the computer 200 such as the mass storage device 212, the I/O interface 214 and the video controller 216.

In one embodiment, the UPS devices monitoring application program 1106 interacts with the network interface card 222 coupled to the I/O interface 214 via the operating system 1102 to communicate with the UPS devices 120 managed by the application program 1106 via the network 110. The UPS devices monitoring application program 1106 communicates with each UPS device 120 managed to gather various information such as voltage thresholds, power thresholds, power failure, battery threshold, network communication status, runtime to failure, load status, temperature status, humidity status, system diagnostics and other information. For example, UPS models SMART-UPS, BACK-UPS and other models available from American Power Conversion based in West Kingston, R.I. are programmed to provide such information when interrogated for status information. The gathered information is stored in the mass storage device 212 of the computer 200 and analyzed by the UPS devices monitoring application program 1106 for UPS device operation abnormalities. If the application program detects abnormalities in one or more UPS devices, the application program causes the operating system to generate pertinent GUIs in the manner as described with respect to FIGS. 3-8 to alert the user of the abnormalities. The operating system 1102 transmits the relevant GUI to the video controller 216 for display in the computer monitor 218.

Many advantages and benefits can be obtained in the embodiments described above. A user is provided with a status-at-a-glance for all managed UPS devices. When one or more UPS devices are operating abnormally, the state of the UPS device can be readily understood through a coded icon scheme. By selecting a UPS device from the UPS device list, the user is represented with information concerning the state of the UPS device and recommended actions, if any. In addition, the user can be provided with a history of power/voltage analysis of the UPS device thereby allowing the user to understand the state of the UPS device and take the appropriate action. Other advantages will be apparent to those skilled in the art.

In embodiments described above, the UPS devices monitoring application program can be implemented as hardware such as application specific integrated circuit (ASIC). In embodiments described above, the computer 200 can be a portable handheld device with a video screen that is capable of communicating with UPS devices via LAN, Internet or wireless access protocol (WAP). In the embodiments described above, the UPS monitoring icon and its various shapes may be replaced with or supplemented with /audio tones, where a unique tone represents the critical state, warning state and unknown state. In other embodiments devices other than UPS devices may be monitored. For example, the device can be an environmental monitor device that provides information concerning temperature and/or humidity within the vicinity of the device.

Having thus described at least one illustrative embodiment of the invention, various alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. In a system coupled to a plurality of uninterruptible power supply (UPS) devices, which are being monitored by the system, the system including a display, a method of monitoring diagnosed states of the UPS devices comprising:
   displaying a single monitoring icon with a normal-indicating appearance in response to each operating characteristic of each of the plurality of UPS devices being monitored by the system being diagnosed to be in a normal state;
   displaying the single monitoring icon with an abnormal-indicating appearance in response to at least one of the UPS operating characteristics of at least one of the plurality of UPS devices being monitored by the system being diagnosed to be in an abnormal state;
   displaying the single monitoring icon with a first abnormal-indicating appearance associated with a first level of abnormal priority when a first of the UPS devices is at the first level of abnormal priority and a second of the UPS devices is at a second level of abnormal priority lower than the first; and
   displaying instructions comprising corrective actions in response to at least one of the UPS devices being diagnosed to be in the abnormal state, wherein the UPS being in the abnormal state comprises the UPS experiencing a power anomaly.

2. The method as recited in claim 1, further comprising:
   diagnosing the abnormal state of the at least one UPS device as one of multiple levels of abnormal states;
   associating each level of abnormal state with a different abnormal-indicating appearance; and
   displaying the monitoring icon with the abnormal-indicating appearance associated with a highest priority diagnosed level of abnormal state of the at least one UPS device.

3. The method as recited in claim 1, further comprising:
   opening a dialog window when the monitoring icon is selected; and
   displaying in the dialog window a list of at least a portion of the UPS devices being monitored and corresponding states of at least some of the UPS devices on the list.

4. The method as recited in claim 3, further comprising:
   receiving an input selecting a UPS device from the list;
   displaying a menu upon selection of a UPS device from the list, the menu comprising at least one UPS management function;
   receiving an input selecting a UPS management function from the menu; and
   causing the UPS management function to be performed on the selected UPS device.

5. The method as recited in claim 4, further comprising:
   opening a status window; and
   displaying in the status window at least one event associated with the state of a UPS device when the UPS device is selected from the list of UPS devices.

6. The method as recited in claim 5, further comprising:
   displaying a selectable power event analysis icon; and
   displaying a power event analysis of a UPS device selected from the list of UPS devices when the power event analysis icon is selected.

7. The method as recited in claim 6, further comprising:
   displaying a selectable voltage analysis icon; and
   displaying a voltage analysis of a UPS device selected from the list of UPS devices when the voltage analysis icon is selected.

8. A system for monitoring states of a plurality of uninterruptible power supply (UPS) devices, the plurality of UPS devices being in operable communication with the system, the system comprising:
   a display;
   a processor in operable communication with the display, the processor being configured to generate a single monitoring symbol having a first appearance on the display in response to each operating characteristic of each of the plurality of UPS devices being monitored being in a first state and having one of a plurality of second appearances otherwise, with at least one of the operating characteristics of at least one of the plurality of the UPS devices being monitored being at one of a plurality of second state levels, the processor further configured to display a selectable power event analysis symbol on the display and to display a power event analysis of a UPS device selected from the list of UPS devices when the power event analysis symbol is selected, wherein the displayed power event analysis corresponds to a user selectable time period;
   wherein the single monitoring symbol will have a second appearance, associated with a high-priority second state level, with a first of the UPS devices being at the high-priority second state level and a second of the UPS devices being at a low-priority second state level.

9. The system as in claim 8, wherein
   the processor is further configured to generate the single monitoring symbol with an appearance associated with a highest second state level presently experienced by any of the plurality of UPS devices.

10. The system as in claim 9, wherein the processor is configured to open a dialog window on the display when the monitoring symbol is selected and to display in the dialog window a list of UPS devices being monitored and a corresponding state of at least a portion of the UPS devices on the list of UPS devices.

11. The system as in claim 10, wherein the processor is further configured to open a status window in the display and to display in the status window at least one event associated with the state of a UPS device when the UPS device is selected from the list of UPS devices.

12. The system as in claim 11, wherein the processor is further configured to display a selectable power event analysis symbol on the display and to display a power event analysis of a UPS device selected from the list of UPS devices when the power event analysis symbol is selected.

13. The system as in claim 12, wherein the processor is further configured to display a selectable voltage analysis symbol on the display and to display a voltage analysis of a UPS device selected from the list of UPS devices when the voltage analysis symbol is selected.

14. A system for monitoring diagnosed states of a plurality of uninterruptible power supply (UPS) devices, the UPS devices being operably coupled to the system, the system comprising:
   means for generating and displaying a single monitoring icon with a normal indication in response to each operating characteristic of each of the plurality of UPS devices coupled to the system being diagnosed to be in a normal state;
   means for generating and displaying a single monitoring icon with a first abnormal-indicating appearance with a particular operating characteristic of a particular UPS device of the plurality of UPS devices coupled to the system diagnosed to be in a first abnormal state having a first priority and another operating characteristic diagnosed to be in a second abnormal state having a second priority that is lower than the first priority, the another operating characteristic being an operating characteristic other than the particular operating characteristic of the particular UPS; and
   means for generating and displaying a selectable voltage analysis symbol and for displaying a voltage analysis of a UPS device selected from the list of UPS devices when the voltage analysis symbol is selected, wherein the displayed voltage analysis corresponds to a user selectable time period.

15. The system of claim 14 further comprising means for diagnosing the state of a UPS device operably coupled to the system.

16. In a system coupled to a plurality of uninterruptible power supply (UPS) devices, which are being monitored by the system, the system including a display, a method of monitoring diagnosed states of the UPS devices comprising:
   displaying a single monitoring icon in a system tray with a normal indication in response to each operating characteristic of each of the plurality of UPS devices being monitored by the system being diagnosed to be in a normal state;
   displaying the single monitoring icon with an abnormal-indicating appearance in response to at least one of the UPS operating characteristics of at least one of the plurality of UPS devices being monitored by the system being diagnosed to be in an abnormal state such that the single monitoring icon has a first abnormal-indicating appearance associated with a first level of abnormal priority when a first of the UPS devices is at the first level of abnormal priority and a second of the UPS devices is at a second level of abnormal priority lower than the first level;
   displaying, in response to a user selecting the single monitoring icon, a status of each of the UPS devices being monitored by the system;
   displaying a selectable power event analysis symbol on the display; and
   displaying, in response to the power event analysis symbol being selected, a power event analysis of a UPS device selected from the list of UPS devices, wherein the displayed power event analysis corresponds to a user selectable time period.

17. A system for monitoring states of a plurality of uninterruptible power supply (UPS) devices, the plurality of UPS devices being in operable communication with the system, the system comprising:
   a display;
   a processor in operable communication with the display, the processor being configured to generate a single monitoring symbol having a first indicator appearance in a system tray displayed on the display in response to each operating characteristic of each of the plurality of UPS devices being monitored being in a first state and a single monitoring symbol having a second indicator appearance in response to at least one of the operating characteristics of at least one of the plurality of the UPS devices being monitored being in a second, alert state with a corresponding first priority level and at least one of the operating characteristics of at least one of the plurality of the UPS devices being monitored being in a second, alert state with a corresponding second priority level of a lower priority than the first priority level;
   wherein the processor is further configured to display, in response to a user selecting the single monitoring icon, a status of the UPS devices being monitored by the system; and
   wherein the processor is further configured to display instructions comprising corrective actions in response to at least one of the UPS devices being diagnosed to be in the second, alert state, wherein the UPS being in the second, alert state comprises the UPS experiencing a power anomaly.

18. A system for monitoring diagnosed states of a plurality of uninterruptible power supply (UPS) devices, the UPS devices being operably coupled to the system, the system comprising:
   means for generating and displaying a single monitoring icon in a system tray with a normal-indicating appearance in response to each operating characteristic of each of the plurality of UPS devices coupled to the system being diagnosed to be in a normal state;
   means for generating and displaying a single monitoring icon with an abnormal-indicating appearance in response to at least one of the operating characteristics of at least one of the plurality of UPS devices coupled to the system being diagnosed to be in an abnormal state;
   means for displaying a status of each of the UPS devices being monitored by the system; and
   means for generating and displaying instructions comprising corrective actions in response to at least one of the UPS devices being diagnosed to be in the abnormal state, wherein the UPS being in the abnormal state comprises the UPS experiencing a power anomaly;
   wherein the single monitoring symbol will have a first abnormal-indicating appearance, associated with a high-priority abnormal state level, with a first of the UPS devices being at the high-priority second state level and a second of the UPS devices being at a low-priority abnormal state level.

19. The method of claim 1 further comprising displaying the monitoring icon with the first abnormal-indicating appearance associated with the first level of abnormal priority when a first operational characteristic of the first UPS device is at the first level of abnormal priority and a second operational characteristic of the first UPS device is at the second level of abnormal priority.

20. The system of claim 8 wherein the processor is further configured such that the monitoring symbol will have the second appearance with the first operating characteristic of the first of the UPS devices being at the high-priority second state level and a different operating characteristic of the first of the UPS devices being at the low-priority second state level.

* * * * *